(12) United States Patent
Mizuno et al.

(10) Patent No.: US 7,179,529 B2
(45) Date of Patent: Feb. 20, 2007

(54) COMPOSITE BASE MATERIAL AND ADHESIVE FILM

(75) Inventors: Eiji Mizuno, Yokohama (JP); Tsuyoshi Tanaka, Sagaminara (JP); Saho Tanuma, Sagaminara (JP)

(73) Assignee: 3M Innovative Properties Company, St. Paul, MN (US)

( * ) Notice: Subject to any disclaimer, the term of this patent is extended or adjusted under 35 U.S.C. 154(b) by 654 days.

(21) Appl. No.: 10/220,768

(22) PCT Filed: Feb. 5, 2001

(86) PCT No.: PCT/US01/40025

§ 371 (c)(1),
(2), (4) Date: Sep. 5, 2002

(87) PCT Pub. No.: WO01/66664

PCT Pub. Date: Sep. 13, 2001

(65) Prior Publication Data

US 2003/0091801 A1     May 15, 2003

(30) Foreign Application Priority Data

Mar. 7, 2000   (JP)   ............................. 2000-067187

(51) Int. Cl.
*C09J 7/02* (2006.01)
*B32B 7/12* (2006.01)

(52) U.S. Cl. ............................... 428/354; 428/355 AC; 428/343; 442/149; 442/151; 248/205.3

(58) Field of Classification Search ................ 428/354, 428/355 AC, 343; 248/205.3; 442/149, 442/151
See application file for complete search history.

(56) References Cited

U.S. PATENT DOCUMENTS

| | | | | |
|---|---|---|---|---|
| 4,024,312 A | * | 5/1977 | Korpman | ..................... 428/343 |
| 4,237,889 A | * | 12/1980 | Gobran | ..................... 604/389 |
| 4,652,473 A | | 3/1987 | Han | |
| 4,741,948 A | | 5/1988 | Konishi et al. | |

FOREIGN PATENT DOCUMENTS

| JP | 61108524 | 5/1986 |
|---|---|---|
| WO | WO 91/15365 | 10/1991 |
| WO | WO 92/11333 | 7/1992 |
| WO | WO 95 06691 A | 3/1995 |
| WO | WO 98/02306 | 1/1998 |

* cited by examiner

*Primary Examiner*—Daniel Zirker
(74) *Attorney, Agent, or Firm*—David B. Patchett

(57) ABSTRACT

To provide an adhesive film that can be easily released leaving substantially no adhesive residue and without damaging the adherend surface when released from an adherend. A base material comprising at least a first resin film with a breaking elongation in the lengthwise direction of 300 to 1500% and a breaking strength of at least 2 kg/12 mm, and a second resin film with a lower breaking elongation and a higher flexural modulus than the first resin film is used. The second resin film can break before the first resin film when the base material is stretched.

10 Claims, 1 Drawing Sheet

COMPOSITE BASE MATERIAL AND ADHESIVE FILM

DETAILED DESCRIPTION OF THE INVENTION

1. Technical Field of the Invention

The present invention relates to a composite base material and an adhesive film using the same. The adhesive film of the present invention can be released after attachment to adherends, allowing its release with stretching of the film (known as "stretch release"), thus rendering it advantageous not only for office use, but also particularly for industrial use.

2. Prior Art

Various types of tacky tapes and adhesive tapes have been proposed and implemented that can be suitably used for a diverse range of purposes. In Japanese National Publication (Kohyo) No. 6-504077, for example, there is disclosed a removable adhesive tape comprising a backing and pressure-sensitive adhesive borne on at least one main surface thereof, characterized in that the backing has a breaking elongation of about 150 to 1200% in the lengthwise direction, an elastic recovery of less than about 50% after elongation and a Young's modulus of at least from about 175.8 kg/cm$^2$ to less than about 5097 kg/cm$^2$, and the tape can be strongly bonded to the base and removed after being stetched at an angle of no greater than about 35° from the surface of the base. This adhesive tape has the effect of being peelable without damaging the adherend or holder, by release within a specified angle with respect to the adhesion side. However, the adhesive tape has a few drawbacks, in that when the backing is formed from a single-material film such as LLDPE (linear low-density polyethylene), HDPE (high-density polyethylene), EVA (ethylene-vinyl acetate copolymer), PP (polypropylene), TPE (thermoplastic elastomers) or the like and the tape is finished for use as an office supply tape, the entire tape has a lighter gauge, i.e. the thickness of the film itself is about 10 to 250 μm and in practice about 20 to 100 μm, so that the low Young's modulus of the material in the unstretched state after fabrication results in a lack of stiffness, thus greatly complicating operations by end-users, such as pulling out and pasting of the tape. The mechanical strength of the adhesive tape, including its stiffness, can be improved by stretching of the raw film material, but when the stiffness is enhanced to a practically usable level by stretching, the tensile strength also increases in excess, while the elongation is also lowered.

In Japanese National Publication (Kohyo) No. 9-502213 there is disclosed an adhesive tape comprising a support and a first pressure-sensitive adhesive composition coated onto at least one surface of the support, wherein the support includes a foamed polymer layer with a thickness of 30 to about 1000 mils (milli-inches) and the support has a breaking elongation of about 50% to about 1200% in the lengthwise direction, while the tape can be firmly bonded to substrates but can also be released therefrom when stretched at an angle of no greater than about 35° from the surface of the substrate, without breaking the support before the tape is released from the substrate and without leaving any substantial residue of the pressure-sensitive adhesive on the substrate. Since this adhesive tape includes a foamed polymer layer as the support it is also adaptable to certain rough surfaces, and it does not limit the freedom of the user. However, the adhesive tape is quite thick, as is obvious from the thickness of the polymer foam layer described above, and therefore while it is convenient for attachment of paintings and the like onto walls and other surfaces, its thickness must be reduced in order to be used as office supply adhesive tape, or as industrial adhesive tape for attachment of masking sheets and the like.

Problems to be Solved by the Invention

It is an object of the present invention to overcome the disadvantages of conventional tacky tapes and adhesive tapes mentioned above, that is, to provide an adhesive film that can be reliably attached to adherends and released when necessary, which can be easily released from adherends leaving substantially no adhesive residue and without damaging the adherend surfaces, and which is easy to handle by users.

It is another object of the invention to provide a film-like base material useful in production of the adhesive film of the present invention.

Means for Solving the Problems

In one aspect thereof, the invention provides a film-like composite base material comprising at least a first resin film with a breaking elongation in the lengthwise direction of 300 to 1500% and a breaking strength of at least 2 kg/12 mm, and a second resin film with a lower breaking elongation and a higher flexural modulus than the first resin film, characterized in that the second resin film breaks before the first resin film when stretched.

In another aspect thereof, the invention provides an adhesive film characterized by comprising a film-like composite base material comprising at least a first resin film with a breaking elongation in the lengthwise direction of 300 to 1500% and a breaking strength of at least 2 kg/12 mm, and a second resin film with a lower breaking elongation and a higher flexural modulus than the first resin film, and an adhesive layer formed on at least one side of the composite base.

EMBODIMENTS FOR CARRYING OUT THE INVENTION

The film-like base material of the invention is a composite base material which is an integral combination of at least two resin films with different properties, preferably by lamination. The first resin film is highly extensible and has high breaking strength, and specifically, it has a breaking elongation in the lengthwise direction of 300 to 1500% and a breaking strength of at least 2 kg/12 mm. The second resin film has a lower breaking elongation and a higher flexural modulus than the first resin film. The first resin film can therefore impart high extensibility and high breaking strength to the base material. The second resin film used in combination with the first resin film improves the stiffness, while it breaks before the first resin film due to its excellent toughness, thus allowing it to impart a "cut and stretch" release mode to the base. In other words, when the composite base material having this construction is stretched in the lengthwise direction, the second resin film breaks earlier at the initial stage of stretching, and after the second resin film has broken it is possible to continue to stretch first resin film with its high extensibility and high breaking strength, so that even when the composite base material is used as a substrate of an adhesive film, the adhesive layer can continue to adhere to the base material allowing adequate release with virtually no residual adhesive on the adherend.

Figure 1:
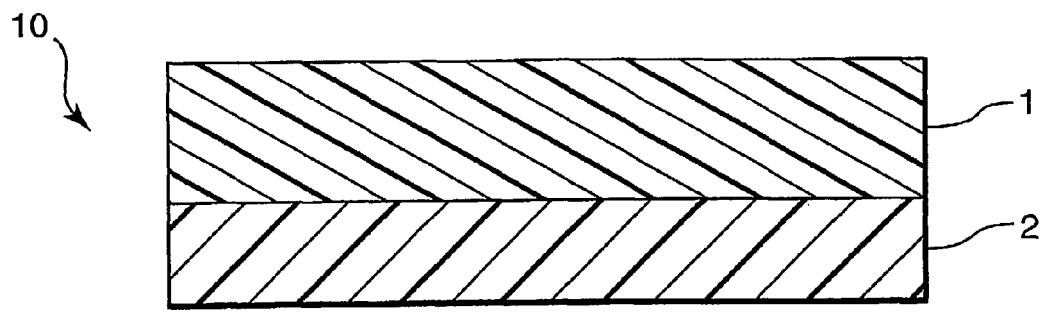
FIG. 1 is a cross-sectional view of a preferred embodiment of a composite base material according to the invention.

FIG. 1 is a cross-sectional view showing a preferred embodiment of a composite base material according to the invention. The composite base 10 in FIG. 1 illustrates a two-layered structure, with a first resin film 1 and a second layer film 2 laminated in an integral manner.

In the composite base material of the invention, the first resin film may be formed of various different resin materials, but it must as an essential condition exhibit a breaking elongation in the lengthwise direction of 300 to 1500% and a breaking strength of at least 2 kg/12 mm. This high extensibility and high breaking strength are particularly necessary for easy release of the adhesive film without damage to the adherend surface when the film is released, and to avoid any substantial residue of the adhesive after release.

Resinous materials that may be advantageously used to form the first resin film include, but are not restricted to, the following examples: polyolefins such as high-density polyethylene (HDPE), low-density polyethylene (LDPE), linear low-density polyethylene (LLDPE), linear ultralow-density polyethylene (LULDPE) and polypropylene (PP); polyvinyl polymers such as polyvinyl chloride (PVC) and polyvinyl acetate (PVA); polyolefin-based copolymers such as ethylene-methacrylic acid copolymer (EEMA) and ethylene-vinyl acetate copolymer (EVA); block copolymers such as acrylate polymer and styrene-isoprene-vinyl acetate copolymer; thermoplastic elastomers (TPE), and the like. These resinous materials may be used alone or in combinations of two or more resinous materials.

The resin film composed of the resinous material described above may be a film in any of various forms. As examples of suitable films there may be mentioned nonwoven fabric films, woven fabric films, porous films and foam films. These films may, if necessary, be used in combination with other forms of film(s) for preparation into a single resin film.

The second resin film used in combination with the first resin film in the composite base material of the invention must as an essential condition be composed of a resin with a lower breaking elongation and a higher flexural modulus than the first resin film. This resin film can therefore compensate for the inadequate stiffness of the first resin film, in order to achieve the above-mentioned special release mode, or "cut and stretch".

Resinous materials that may be advantageously used to form the second resin film include, but are not restricted to, the following examples: polymethyl methacrylate, polycarbonate, polyethylene terephthalate, polystyrene, polyimide, cellulose acetate and the like. These resinous materials may be used alone or in combinations of two or more resinous materials.

The resin film composed of the resinous material described above may be a film in any of various forms, as described for the first resin film above. As examples of suitable films there may be mentioned nonwoven fabric films, woven fabric films, porous films and foam films. These films may, if necessary, be used in combination with other forms of film(s) for preparation into a resin film.

The second resin film may, if necessary, contain an organic or inorganic filler dispersed in the film. For example, inorganic fillers include calcium carbonate, titanium oxide, silica and the like. Such fillers are useful for enhancement of the film stiffness, lowering the elongation yield point to prevent the film from being easily cut, and lowering the breaking strength.

While the organic or inorganic filler included in the second resin film may be of any form or size, it is preferably in the form of globular particles, needle-like crystals or a similar form, and while its size may vary widely, it is usually in the range of about 1 to 20 µm. For example, in the case of needle-like whiskers, they are preferably relatively fine with a length of preferably in the range of about 1 to 15 µm, and more preferably in the neighborhood of about 10 µm. The diameter of such needle-like whiskers will usually be in the neighborhood of about 0.1 µm. If the size of the filler used here is smaller than 1 µm it will be necessary to use a large amount of filler to achieve the effect of the added filler, while if it is over 20 µm an adverse influence may be exhibited against formation of the film and the other desired effects.

The filler such as described above may be included in the resin film in an amount within a wide range of selection, but in most cases it is preferably added in the range of about 5 to 50 wt %. If the amount of filler added is less than 5 wt % the effect of addition may not be exhibited, and if it is added at greater than 50 wt % an adverse influence may be exhibited against formation of the film and the other desired effects. In most cases, the filler is preferably added in the neighborhood of about 10 wt %.

The composite base material of the invention has a "cut and stretch" feature as the first resin film stretches after the second resin film has broken; however, if the breaking strength of the second resin film is higher than the yield stress of the first resin film, not only will there be a feeling of resistance upon stretching, but breakage of the second resin film will simultaneously increase the possibility of breakage of the first resin film.

In order to more successfully exhibit the "cut and stretch" performance, it is effective to reduce the layer proportion of the second resin film, so long as this does not cause a problem for the working step or for attachment when used as an adhesive tape. However, reducing the layer proportion of the second resin film will lower the breaking strength and reduce the stiffness. The layer proportion of the second resin film can be reduced by adding needle-like whiskers or the like to the second resin film. This can improve the stiffness while keeping a low breaking strength. The overall thickness of the composite base material can therefore be decreased by reducing the layer proportion.

The composite base material of the invention may, if necessary, be colored with a desired color. Coloration can improve the manageability of the finally obtained adhesive tape. The coloration may be carried out for either the first or second resin film, but it is usually preferred for the second resin film. The color for the coloration may be a single color, or two or more different colors may also be combined for design enhancement.

Figure 2:
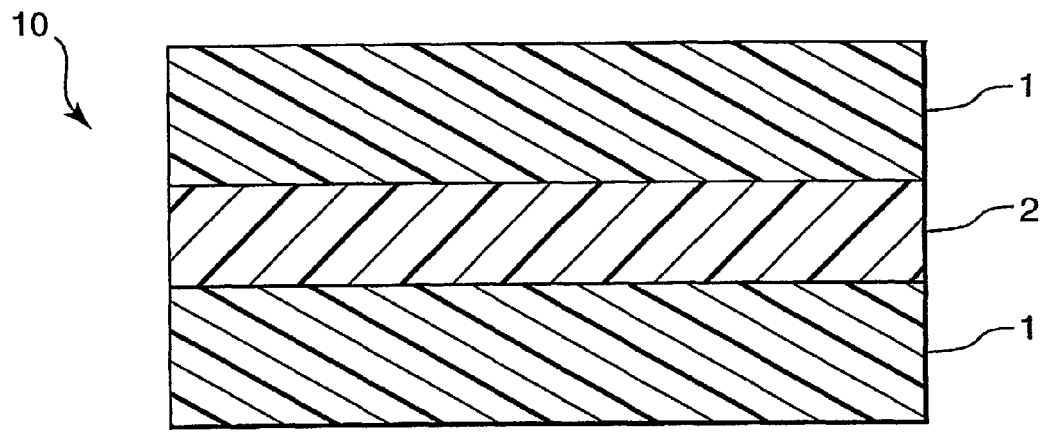
FIG. 2 is a cross-sectional view of another preferred embodiment of a composite base material.

The composite base material of the invention may, if necessary, have a multilayered structure of three or more layers, and usually a three-layered structure such as shown in FIG. 2 is preferred. The composite base material 10 of FIG. 2 is a modified form of the composite base material shown in FIG. 1, having a construction wherein the second resin film 2 is sandwiched by first resin films 1. By thus sandwiching the second resin film 2 with two sheets of first resin films 1, it is possible to obtain an effect of reinforced stiffness, firmness and ease of use beyond that obtained with a single first resin film. Furthermore, since the second resin film 2 is enclosed, scattering of fine broken pieces or the added filler powder into the surrounding area can be prevented even when it breaks first.

The composite base material of the invention may also include other additional layers, not shown, employed in the field of adhesive films when necessary, such as cushion layers, release layers and the like, that do not adversely influence the function and effect of the invention and that can offer additional effects.

The thickness of the composite base material of the invention may be varied within a wide range depending on the intended use, but in most cases the total thickness of the first and second resin films is preferably in the range of about 10 to 250 µm, and more preferably in the range of about 30 to 100 µm. If the thickness of the composite base material is under 10 µm, it may not be possible to maintain sufficient tensile strength or the function as an adhesive film base may be lost; conversely, if it is over 250 µm the higher tensile strength may substantially complicate release of the tape from adherends, and the effect of producing a light-gauge adhesive film may be impaired.

The composite base material of the invention can be produced using techniques commonly employed for fabrication of conventional composite films. For example, it may be produced by simultaneously extruding the resin materials for the first and second resin films through an appropriate die, and then drawing them. Alternatively, each resin film may be prepared beforehand and then laminated and fusion bonded into an integral body. The respective resin films may be bonded with an adhesive in some cases.

In addition to the composite base material, the present invention also provides an adhesive film employing the composite base material of the invention. That is, an adhesive film according to the invention is an adhesive film characterized by comprising an adhesive layer formed on at least one side of the composite base material of the invention.

Figure 3:
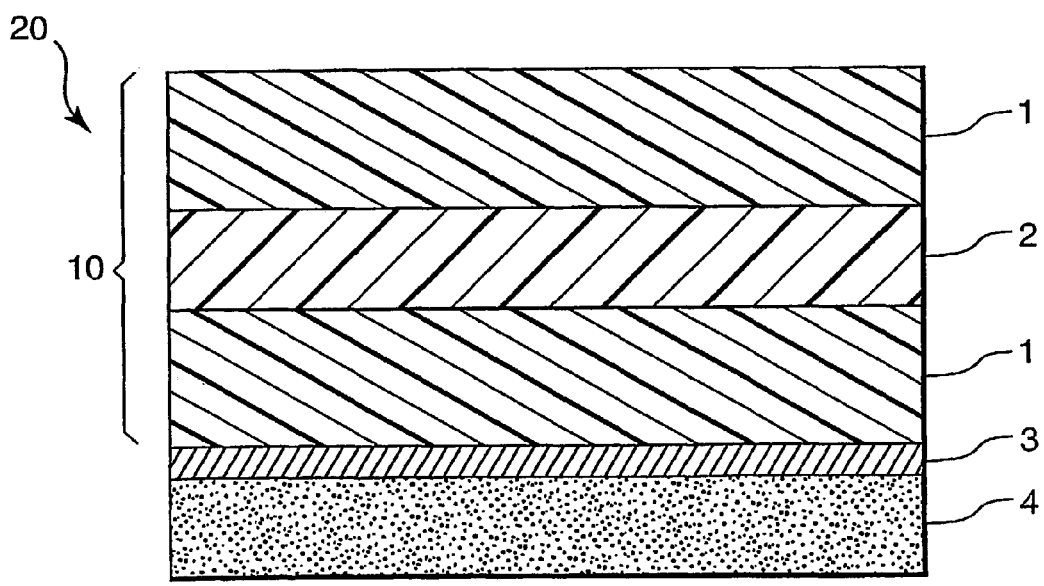
FIG. 3 is a cross-sectional view of a preferred embodiment of an adhesive film according to the invention.

A typical embodiment of the adhesive film of the invention is shown in FIG. 3. In the case of the adhesive film 20 shown in the drawing, the adhesive layer 4 is formed on the side of one first resin film 1 of the composite base material 10 of the invention which is illustrated in FIG. 2 and explained above, via a primer layer 3.

In the adhesive film of the invention, the adhesive layer may be formed from any conventional adhesives in the field of adhesive films. As examples of appropriate adhesives there may be mentioned acrylic-based adhesives, such as copolymer of isooctyl acrylate and acrylic acid, synthetic rubber-based adhesives such as polysilicone, polyisoprene, polybutadiene, styrene-isoprene-styrene copolymer, natural rubber-based adhesives, and the like. Acrylic-based adhesives and synthetic rubber-based adhesives are particularly useful.

These adhesives may be coated and dried onto one or both sides of the composite base material using a well-known technique such as spin coating, screen printing or the like. It is usually preferred for the adhesive-coated side of the composite base material to be pretreated by primer treatment, etc. according to a well-known technique, in order to promote coating and attachment of the adhesive. The thickness of the dried adhesive layer may vary widely depending on the properties of the desired adhesive film and other factors, but it will usually be in the range of about 10 to 100 µm. The surface of the adhesive layer may also have a release liner or the like, or be subjected to other release treatment, as is commonly done in the technical field, in order to protect it from undesired attachment.

The adhesive film of the invention must have a 180° peel strength of at least 160 g/25 mm as measured with a peel rate of 300 mm/minute. This is because if the 180° peel rate is any lower it may not be possible to simultaneously satisfy the important effects of the invention, which are greater adhesive strength, lack of damage to adherends upon release, and substantially no residue of the adhesive after release.

When the adhesive film of the invention is attached to an adherend, it can be simply and easily peeled off by stretching the side of the adhesive film with no adhesive layer at an angle within 35° of the attachment surface as it is peeled off after attachment to the adherend; there is virtually no inconvenient residue of the adhesive on the film attachment surface of the adherend.

The adhesive film of the invention may be provided in a variety of different forms. For example, the adhesive film of the invention may be laminated without using a release sheet, such as a "Post-It™"-type laminate wherein the adhesive is coated in the same direction. The adhesive film of the invention may also be laminated by coating the adhesive in different directions. Alternatively, the adhesive film of the invention may be in the form of a rectangular sheet with the adhesive layer formed on only one side of the composite base material, and made into a concertina laminate where the portions with no adhesive layer are alternately stacked. Such a laminate can be housed in an appropriate dispenser to provide a "pop-up" construction, so that each sheet can be pulled out for use as necessary.

The adhesive film of the invention can be advantageously used in a variety of fields. As examples of suitable uses for the adhesive film there may be mentioned its use as common office supply adhesive tape, and its use as masking tape for closing of the ends of masking sheets at working sites, construction sites and the like.

EXAMPLES

The present invention will now be further explained referring to the examples. It is to be understood, however, that the invention is in no way limited by these examples.

Example 1

The following commercially available stock materials were provided as materials for the first and second resin films. The properties of each film are also described.

First Resin Film:

Linear Low-density Polyethylene (LLDPE)
  Available from Mitsui Chemical Co. under the product name "Ultzex 2520 F"
  Lengthwise breaking elongation: 550% (total for top and bottom layers)
  Breaking strength: 3.3 kg/12 mm (total for top and bottom layers)

Second Resin Film:

Polymethylmethacrylate (PMMA)
  Available from Mitsubishi Rayon Co. under the product name "Acrypet MF"
  Lengthwise breaking elongation: 10%
  Breaking strength: 1.2 kg/12 mm
  The polymethylmethacrylate (PMMA) and the linear low-density polyethylene (LLDPE) were co-extruded with a T-die to fabricate a composite film with a three-layered structure (LLDPE/PMMA/LLDPE=26 μm/8 μm/26 μm). The stiffness of the resulting composite film was measured and found to be 0.82 g/12 mm. In this example, the stiffness was measured by the following procedure.

Measurement of Stiffness

Measuring device: Heart loop stiffness meter

Measuring procedure:

The composite film is cut into a thin strip test piece with a width of ½ inch (about 25 mm) and a length of about 15 to 18 cm, and this is set on the table of the measuring device with both ends of the test piece anchored with a magnet jig. The measuring device switch is turned on and both magnet jigs are automatically slid to the center of the table to form a loop with the test piece. After the test piece loop has been formed, the table is laid on its side while a sensor mounted on the measuring device is moved toward the loop at a rate of 200 mm/minute to crush the test piece loop. The maximum value of the stress at the point the loop is crushed by the progressing sensor is recorded as the stiffness.

The obtained composite film was used as a base material, and was subjected to primer treatment on one side. The primer used was a solution obtained by diluting chlorinated polypropylene (commercially available as "Hardlen B-13" (product name of Toyo Kasei Co.)) with toluene to a 2% solid concentration. After hand coating the primer onto the surface of the base material, an adhesive resin comprising isooctyl acrylate-acrylic acid (95:5) copolymer was transferred to a film thickness of 5 μm by a screen printing method, and dried. Upon measurement of the 180° peel strength of the resulting adhesive film, it was found to be 450 g/25 mm when measured at a peel rate of 300 mm/min. For this example, the 180° peel strength of the adhesive film was determined according to the following procedure.

Measurement of 180° Peel Strength

Measuring apparatus: Slip/peel tester ("Model 3M90", product name of Instrumentors Inc., U.S.)

Measuring procedure:

A 50-mm wide×150-mm long stainless steel test panel was prepared and the region within 25 mm of the end of the panel was coated with masking tape. Also, a composite film cut to a width of ½ inch (about 25 mm) and a length of about 15 cm was prepared as a thin test strip. The prepared test strip was attached to the surface of the test panel with a pressure-sensitive adhesive so that the end portion of the test strip overlapped the masking tape. The bond between the test panel and the test strip was strengthened by reciprocally moving a 4.5-kg weight roller over the test strip after attachment. One end of the test strip (the portion not adhered to the test panel) was then separated from the masking tape by hand, and the test strip was stretched at a 180° peel angle and a rate of 305 mm/min. The peel length of the test strip was 127 mm, but for a more accurate measurement the peel data for the first 25 mm were not used. The average peel strength measured for the rest of the peel length was recorded as the 180° peel strength.

After also attaching the obtained adhesive film onto a plain paper, a portion of the non-attached side of the adhesive film was stretched at an angle within 35°, and it was possible to easily release the adhesive tape without breaking the plain paper and without producing any substantial residue after the release. The adhesive tape felt hard at the first stage of stretching, believed to be due to the PMMA film in the middle, but this film broke shortly thereafter. Stretching was then facilitated due to the highly extensible LLDPE films on the outside.

Comparative Example 1

The procedure described in Example 1 above was repeated, but, for comparison, in this example, a 60-μm thick single-layer film consisting of LLDPE alone was used instead of the 60-μm thick three-layered structure composite film of LLDPE/PMMA/LLDPE. The stiffness of the single-layer film was measured by the same method described in Example 1 and confirmed to be 0.52 g/12 mm, which was less than about ⅔ of the stiffness of the composite film of Example 1.

Example 2

For evaluation of the effect of adding a filler to the second resin film, in this example, needle-like whiskers were added to the PMMA film used as the second resin film in Example 1, and the breaking strength of the film was measured. The PMMA film used here was a single layer (15 μm thickness), and the needle-like whiskers were barium titanate whiskers ("TISMO", product name of Otsuka Chemical Co.) having a diameter of approximately 0.1 μm and a length of about 10 μm, which were added to a content of 10 wt % (with respect to the total weight of the film).

The breaking strengths of the PMMA film (containing no whiskers) and the PMMA film (containing whiskers) were measured, giving the following results.

| | |
|---|---|
| PMMA film | 250 g/12 mm |
| Whisker-containing PMMA film | 150 g/12 mm |

The results of the measurement demonstrate that it was possible to considerably reduce the breaking strength by using a resin film obtained by adding whiskers to a PMMA film.

Effect of the Invention

As explained above, by using the base material described above according to the present invention it is possible to provide an adhesive film that can be reliably attached to adherends, that can be easily released from adherends in a special release mode of "cut and stretch", leaving substantially no adhesive residue and without damaging the adherend surface or holder when released from an adherend, and that is easy to handle by users. The present invention also provides a composite base material that can guarantee sufficient firmness even with a small thickness.

Explanation of Symbols 1 first resin film
2 second resin film
3 primer layer
4 adhesive layer
10 composite base material
20 adhesive film

What is claimed is:

1. A film-like composite base material comprising at least a first resin film with a breaking elongation in the lengthwise direction of 300 to 1500% and a breaking strength of at least 2 kg/12 mm, and a second resin film with a lower breaking elongation and a higher flexural modulus than said first resin film, said second resin film including a needle-like whiskers filler, characterized in that said second resin film breaks before said first resin film when stretched.

2. A composite base material according to claim 1, characterized in that said first resin film is laminated on both sides of said second resin film.

3. A composite base material according to claim 1 or 2, characterized by having a thickness of 10 to 250 μm.

4. An adhesive film characterized by comprising a film-like composite base material comprising at least a first resin film with a breaking elongation in the lengthwise direction of 300 to 1500% and a breaking strength of at least 2 kg/12 mm, and a second resin film with a lower breaking elongation and a higher flexural modulus than said first resin film, and an adhesive layer formed on at least one side of said composite base material, wherein said second resin film includes a dispersed filler in a form of needle-like whiskers, characterized in that said second resin film breaks before said first resin film when stretched.

5. An adhesive film according to claim 4, characterized in that said adhesive layer is formed from an acrylic adhesive or synthetic rubber adhesive, and the 180° peel force of said adhesive film is at least 160 g/25 mm when measured at a peel rate of 300 mm/minute.

6. An adhesive film according to claim 4, wherein said adhesive layer is configured to be released from an adherend when said adhesive layer is stretched to elongate said first resin film and to break said second resin film.

7. An adhesive film according to claim 4, wherein said needle-like whiskers have a length in the range of about 1 to 15 μm.

8. An adhesive film according to claim 4, wherein said needle-like whiskers have a diameter of about 0.1 μm.

9. An adhesive film according to claim 4, wherein said adhesive film is configured such that when applied to an adherend and subjected to a pulling force, said second resin film initially breaks followed by stretching of said first resin film.

10. A method of using an adhesive film, said method comprising:
    providing an adhesive film as defined in claim 4;
    adhering said adhesive layer to an adherend; and
    applying a pulling force to one end of said adhesive film to remove said adhesive film from said adherend, characterized by:
    i) said second resin film initially breaking in response to said pulling force,
    ii) said first resin film stretching in response to said pulling force after said second resin film has broken to effectuate stretch release of said adhesive film from said adherend.

* * * * *